(12) United States Patent
Itou et al.

(10) Patent No.: US 12,462,170 B2
(45) Date of Patent: Nov. 4, 2025

(54) PREDICTION INTERPRETATION APPARATUS AND PREDICTION INTERPRETATION METHOD

(71) Applicant: NTT DOCOMO, INC., Tokyo (JP)

(72) Inventors: Taku Itou, Tokyo (JP); Keiichi Ochiai, Tokyo (JP); Yusuke Fukazawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1260 days.

(21) Appl. No.: 17/269,425

(22) PCT Filed: Aug. 22, 2019

(86) PCT No.: PCT/JP2019/032843
§ 371 (c)(1),
(2) Date: Feb. 18, 2021

(87) PCT Pub. No.: WO2020/040253
PCT Pub. Date: Feb. 27, 2020

(65) Prior Publication Data
US 2021/0182712 A1 Jun. 17, 2021

(30) Foreign Application Priority Data
Aug. 24, 2018 (JP) .................... 2018-157718

(51) Int. Cl.
*G06N 5/04* (2023.01)
*G06F 16/2457* (2019.01)
(Continued)

(52) U.S. Cl.
CPC ......... *G06N 5/04* (2013.01); *G06F 16/24575* (2019.01); *G06F 17/18* (2013.01); *G06N 20/00* (2019.01); *G16H 50/20* (2018.01)

(58) Field of Classification Search
CPC .... G06N 5/04; G06N 20/00; G06F 16/24575; G06F 17/18; G06Q 10/04; G16H 50/20;
(Continued)

(56) References Cited

U.S. PATENT DOCUMENTS 10,877,444 B1 * 12/2020 Roach ................. A61B 5/7405
11,594,311 B1 * 2/2023 Bradley ................. G16H 50/30
(Continued)

FOREIGN PATENT DOCUMENTS

JP 2009057337 A 3/2009

OTHER PUBLICATIONS

Wang, Fei, Jimeng Sun, and Shahram Ebadollahi. "Composite distance metric integration by leveraging multiple experts' inputs and its application in patient similarity assessment." Statistical Analysis and Data Mining: The ASA Data Science Journal 5.1 (2012): 54-69. (Year: 2012).*

(Continued)

*Primary Examiner* — Andrew L Tank
(74) *Attorney, Agent, or Firm* — Osha Bergman Watanabe & Burton LLP

(57) ABSTRACT

A prediction interpretation apparatus, comprising: a data storage unit configured to store data of a plurality of users; a model storage unit configured to store a prediction model learned from data of the whole of the plurality of users; a vicinity user search unit configured to extract vicinity users for the target user from the data storage unit; a linear regression model learning unit configured to learn a linear regression model approximated to the prediction model for the vicinity users; and an interpretation result output unit configured to output an interpretation result of prediction for the target user based on a partial regression coefficient of the linear regression model, wherein the vicinity user search unit extracts the vicinity user by narrowing vicinity user
(Continued)

candidates extracted based on distance between users based on a prediction direction of the target user by the prediction model.

6 Claims, 7 Drawing Sheets

(51) Int. Cl.
  *G06F 17/18* (2006.01)
  *G06N 20/00* (2019.01)
  *G16H 50/20* (2018.01)
(58) Field of Classification Search
  CPC ........ G16H 50/30; G16H 50/70; G16H 10/20; G16H 20/70
  See application file for complete search history.

(56) References Cited

U.S. PATENT DOCUMENTS

| | | | | |
|---|---|---|---|---|
| 2005/0108753 | A1* | 5/2005 | Saidi | G06F 17/18 725/45 |
| 2008/0064118 | A1* | 3/2008 | Porwancher | G16H 50/20 703/11 |
| 2009/0089023 | A1* | 4/2009 | Watanabe | G06Q 10/04 703/2 |
| 2017/0220937 | A1* | 8/2017 | Wada | G06F 16/2228 |
| 2017/0293919 | A1* | 10/2017 | Li | G06Q 30/0201 |
| 2018/0046942 | A1* | 2/2018 | Conroy | G06N 20/00 |
| 2018/0096739 | A1* | 4/2018 | Sano | G06F 16/316 |
| 2019/0088159 | A1* | 3/2019 | Minturn | G16H 50/30 |
| 2019/0096529 | A1* | 3/2019 | Arffa | G16H 50/30 |
| 2021/0012244 | A1* | 1/2021 | Taniguchi | G06N 20/20 |

OTHER PUBLICATIONS

Stojanovic, Jelena, Djordje Gligorijevic, and Zoran Obradovic. "Modeling customer engagement from partial observations." Proceedings of the 25th ACM International on Conference on Information and Knowledge Management. 2016. (Year: 2016).*

Cheng, Yu, et al. "Risk prediction with electronic health records: A deep learning approach." Proceedings of the 2016 SIAM international conference on data mining. Society for Industrial and Applied Mathematics, 2016. (Year: 2016).*

Ribeiro, Marco Tulio, Sameer Singh, and Carlos Guestrin. ""Why should i trust you?" Explaining the predictions of any classifier." Proceedings of the 22nd ACM SIGKDD international conference on knowledge discovery and data mining. 2016. (Year: 2016).*

Hsieh, Cheng-Kang, et al. "Collaborative metric learning." Proceedings of the 26th international conference on world wide web. 2017. (Year: 2017).*

Saritha, K., and Sajimon Abraham. "Prediction with partitioning: Big data analytics using regression techniques." 2017 International Conference on Networks & Advances in Computational Technologies (NetACT). IEEE, 2017. (Year: 2017).*

Shishvan, Omid Rajabi, Daphney-Stavroula Zois, and Tolga Soyata. "Machine intelligence in healthcare and medical cyber physical systems: A survey." IEEE Access 6 (2018): 46419-46494. (Year: 2018).*

Wu, W., Chen, L. & Zhao, Y. Personalizing recommendation diversity based on user personality. User Model User-Adap Inter 28, 237-276 (2018). https://doi.org/10.1007/s11257-018-9205-x (Year: 2018).*

Of Kulev, Igor, et al. "Evaluating an ordered list of recommended physical activities within health care system." International Conference on ICT Innovations. Cham: Springer International Publishing, 2014 (Year: 2014).*

R. Eto et al. "Fully-Automatic Bayesian Piecewise Sparse Linear Models" Proceedings of the Seventeenth International Conference on Artificial Intelligence and Statistics, PMLR 33: 238-246, 2014 (9 pages).

International Search Report issued in International Application No. PCT/JP2019/032843, mailed Nov. 19, 2019 (3 pages).

Written Opinion issued in International Application No. PCT/JP2019/032843; Dated Nov. 19, 2019 (3 pages).

\* cited by examiner

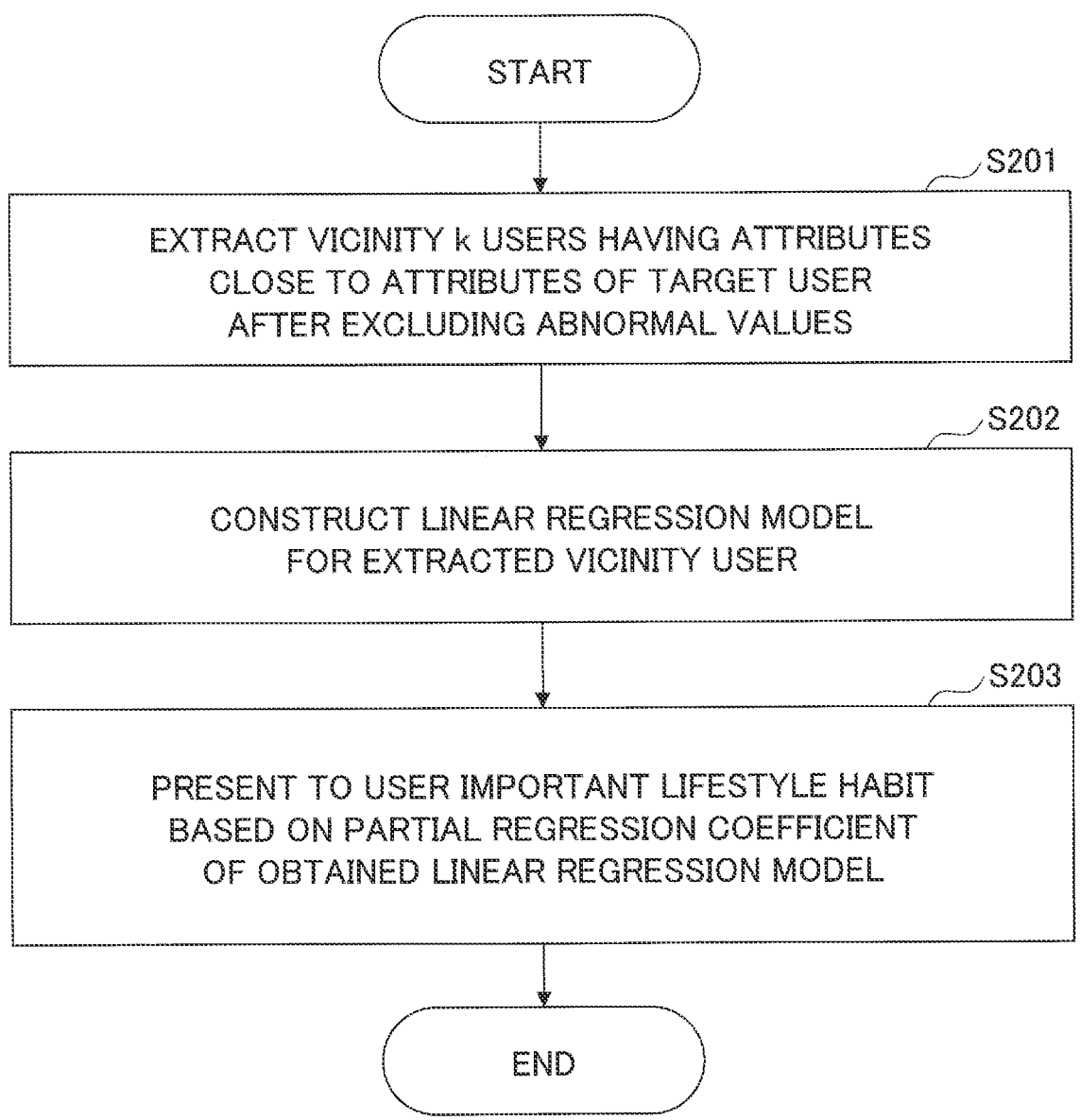

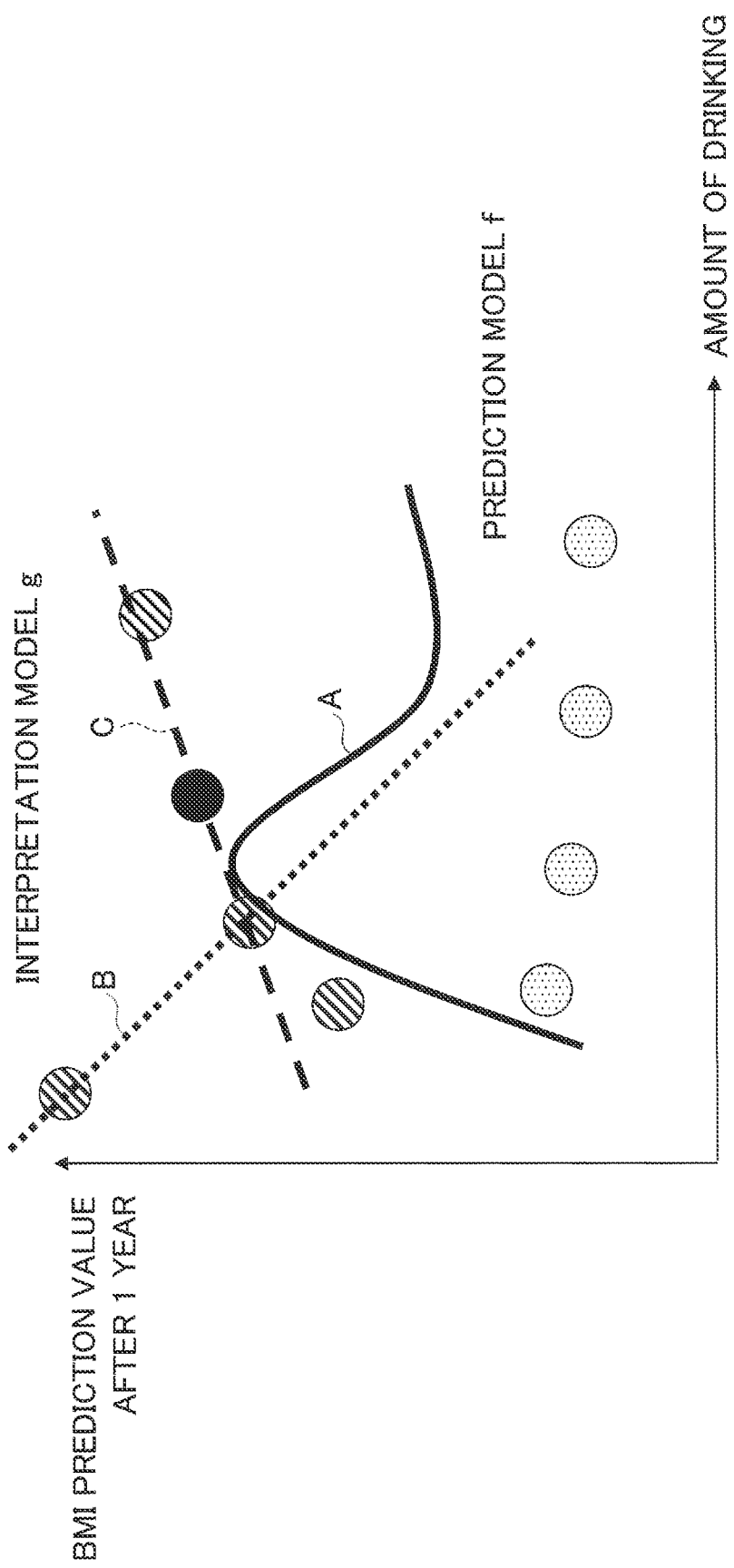

FIG.6

| LIFESTYLE HABIT | PRESENT STATE |
|---|---|
| HAVING EXERCISE HABIT OF 30 MINUTES OR MORE PER DAY | YES |
| HAVING DINNER MORE THAN 2 HOURS BEFORE GOING TO BED MORE THAN 3 DAYS A WEEK | YES |
| SMOKING CIGARETTES CUSTOMARILY | NO |
| HAS GAINED MORE THAN 10 kg SINCE 20 YEARS OLD | NO |
| WALKING SPEED IS FASTER THAN THOSE OF THE SAME SEX AND SAME AGE | YES |
| THERE IS MORE THAN ± 3 kg OF WEIGHT CHANGE FOR ONE YEAR | NO |
| EATING SPEED | NORMAL |
| HAVING NIGHT SNACK OR SNACK AT LEAST 3 DAYS PER WEEK | NO |
| DRINKING HABIT | SOMETIMES |
| AMOUNT OF DRINKING PER DAY | 1GO–2GO |
| TAKING A REST BY SLEEPING | YES |

PREDICTION INTERPRETATION APPARATUS AND PREDICTION INTERPRETATION METHOD

CROSS-REFERENCE TO RELATED APPLICATIONS

This application is a national phase application of PCT/2019/032843, filed on Aug. 22, 2019, which claims priority to Japanese Patent Application No. 2018-157718, filed on Aug. 24, 2018. The contents of these applications are hereby incorporated by reference in their entirety.

TECHNICAL FIELD

The present invention relates to techniques for interpreting prediction results based on machine learning. An example of the application of this technology is a technique for independently calculating life habits that affect health, while making high-precision health predictions.

BACKGROUND ART

In recent years, techniques have been used to predict results from input data using prediction models constructed by machine learning.

Techniques are also used to interpret prediction results, such as which factors in the input data significantly affect the prediction results. One technique that enables the interpretation of such predictions is, for example, a technique called LIME. LIME allows the interpretation of prediction results in machine learning by independently calculating prediction models in machine learning and models for interpretation of predictions.

There are also techniques that enable the interpretation of prediction results such as using importance of random forests (e.g., Patent Document 1) and heterogeneous mixed learning (e.g., Non-Patent Document 1) in which models are learned by combining a decision tree and regression.

PRIOR ART DOCUMENTS

Patent Documents

Japanese Patent Application Laid-Open No. 2009-057337

Non-Patent Documents

[Non-patent Document 1] Riki Eto, Ryohei Fujimaki, Satoshi Morinaga, Hiroshi Tamano; Proceedings of the Seventeenth International Conference on Artificial Intelligence and Statistics, PMLR 33: 238-246, 2014.

SUMMARY OF INVENTION

Problem to be Solved by the Invention

However, in the above-described LIME, even if the prediction can be performed with high accuracy, there is a problem that interpretation accuracy is low because interpretation may have a counterintuitive interpretation. In addition, in the technology disclosed in Patent Document 1 and Non-Patent Document 2, there is a trade-off between increasing the prediction accuracy and increasing the interpretation accuracy, and it is difficult to perform both with high accuracy.

The present invention has been made in view of the foregoing, and is intended to provide a technique that enables prediction by machine learning and interpretation of prediction to be performed with high precision.

Means for Solving Problems

According to the disclosed technique, there is provided a prediction interpretation apparatus, including:
a data storage unit configured to store data of a plurality of users;
a model storage unit configured to store a prediction model learned from data of the whole of the plurality of users;
a vicinity user search unit configured to extract vicinity users for the target user from the data storage unit;
a linear regression model learning unit configured to learn a linear regression model approximated to the prediction model for the vicinity users; and
an interpretation result output unit configured to output an interpretation result of prediction for the target user based on a partial regression coefficient of the linear regression model,
wherein the vicinity user search unit extracts the vicinity user by narrowing vicinity user candidates extracted based on distance between users based on a prediction direction of the target user by the prediction model.

Effects of the Invention

The disclosed technique provides a technique that allows prediction by machine learning and interpretation of predictions to be performed with high precision.

BRIEF DESCRIPTION OF DRAWINGS

FIG. 4 is a flowchart illustrating an operation of the important life habit returning apparatus 100.

FIG. 5 is a diagram for explaining extraction of a vicinity user;

FIG. 6 is a diagram illustrating an example of a screen output by the important life habit returning apparatus 100.

MODE FOR CARRYING OUT THE INVENTION

Hereinafter, embodiments of the present invention (this embodiment) will be described with reference to the drawings. The embodiments described below are merely examples, and the embodiments to which the present invention is applied are not limited to the following embodiments.

Hereinafter, as an embodiment of the present invention, an important life habit returning apparatus 100 for presenting (returning) an important life habit relating to a health risk will be described. However, the scope of application of the present invention is not limited thereto, and the present invention is applicable to various fields.

(Example of Functional Configuration of the Important Life Habit Returning Apparatus 100)

Figure 1:
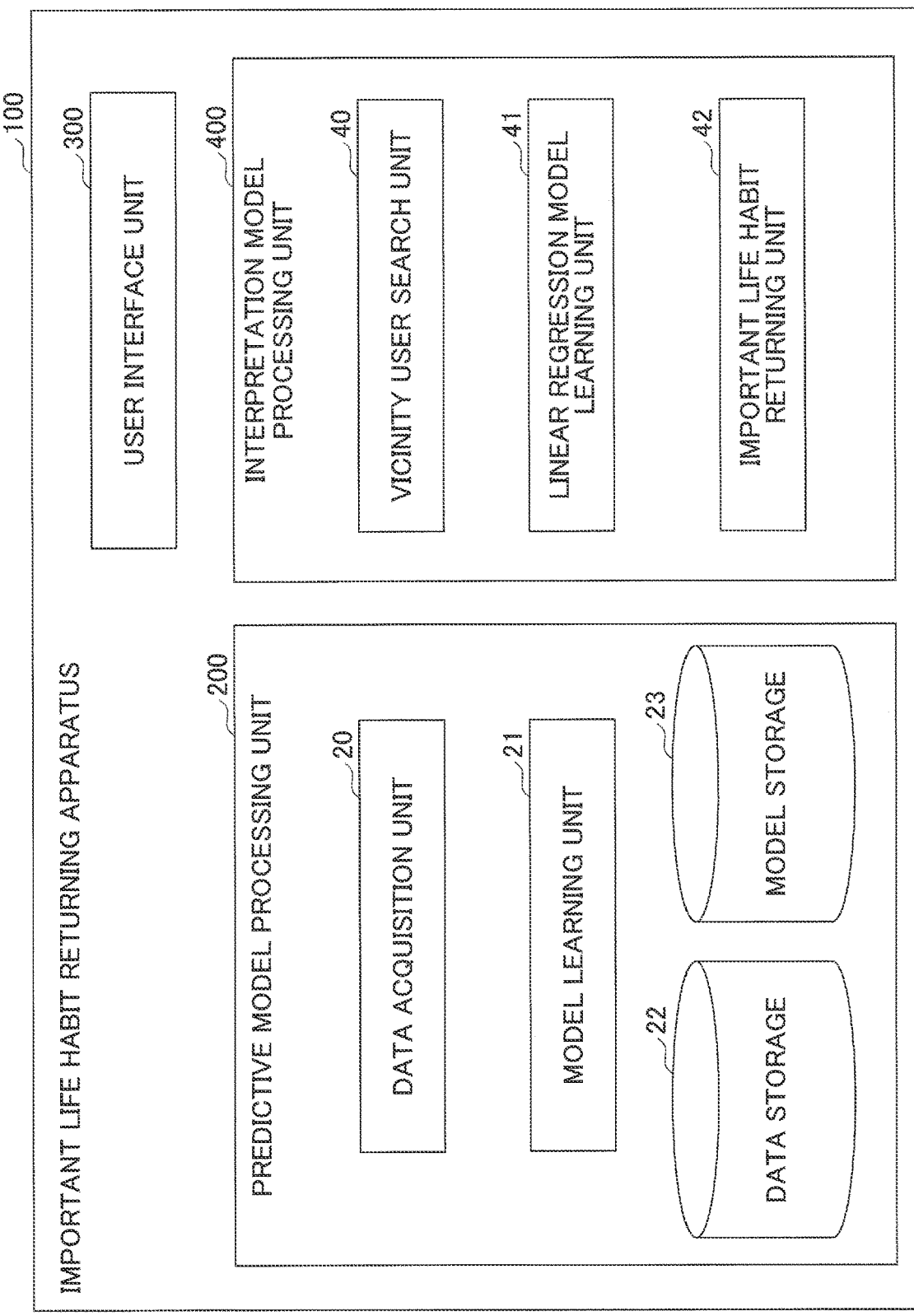
FIG. 1 is a diagram illustrating a functional configuration of an important life habit returning apparatus 100 according to an embodiment of the present invention.

FIG. 1 is a functional configuration diagram illustrating the important life habit returning apparatus 100 according to the present embodiment. As shown in FIG. 1, the important life habit returning apparatus 100 according to the present embodiment includes a predictive model processing unit 200, a user interface 300, and an interpretation model processing unit 400.

The predictive model processing unit 200 is a processing unit that performs learning before the user actually accesses from the user terminal, and constructs the prediction model from the entire data of a plurality of users. The interpretation model processing unit 400 creates an interpretation model using data of users in the vicinity of a user (a target user) requesting a suggestion of a life habit improvement plan.

According to the present embodiment, it is assumed that the important life habit returning apparatus 100 and the user terminal are connected via a network. The user interface unit 300 performs processing such as displaying a screen (a web screen or the like) on the user terminal via the network or receiving input information from the user terminal. For example, the user interface unit 300 accepts access from the user terminal of the user requesting to present a proposal for improving lifestyles. The user may operate the important life habit returning apparatus 100 directly. In this case, the user interface unit 300 may be, for example, a display and a keyboard, a touch panel capable of input/output operations, or the like. Hereinafter, the predictive model processing unit 200 and the interpretation model processing unit 300 will be described in more detail.

As shown in FIG. 1, the predictive model processing unit 200 includes a data acquisition unit 20, a model learning unit 21, a data storage unit 22, and a model storage unit 23.

The data acquisition unit 20 acquires medical examination data of all users and interview result data of life habits, and stores the acquired data in the data storage unit 22. Medical examination data and life habit interview results data are obtained, for example, via a network from a predetermined server that stores them. The acquired data also includes attributes and the like of each user in association with the medical examination data and the results of the interview data on life habits. The medical examination data and the results of interviews on life habits may be regarded as "attributes."

The model learning unit 21 reads out the data acquired by the data acquisition unit 20 from the data storage unit 22, learns a prediction model of the health risk of the entire user using the data, and stores the learned prediction model in the model storage unit 23.

The data storage unit 22 and the model storage unit 23 respectively store the above-described data. The data storage unit 22 and the model storage unit 23 may be outside of the predictive model processing unit 200. The data storage unit 22 and the model storage unit 23 may be on a network outside of the important life habit returning apparatus 100.

The interpretation model processing unit 400 includes a vicinity user search unit 40, a linear regression model learning unit 41, and an important life habit returning unit 42.

By referring to the data storage unit 22, the vicinity user search unit 40 extracts, as vicinity users, users that have an attribute close to that of the target user and that do not significantly deviate from prediction results of the target user in the prediction model.

The linear regression model learning unit 41 learns a linear regression model that approximates the prediction model learned by the predictive model processing unit 200 for only the vicinity users extracted by the vicinity user search unit 40, and stores the learned linear regression model in the model storage unit 23. This linear regression model is a prediction model for interpretation and can be called an interpretation model.

The important life habit returning unit 42 returns to the user an important life habit that should be improved for the target user through the user interface unit 300 based on partial regression coefficients of the linear regression model learned by the linear regression model learning unit 41.

(Example of Hardware Configuration)

A block diagram of the important life habit returning apparatus 100 shown in FIG. 1 shows a block of functional units. These functional blocks (components) are implemented, for example, by a combination of hardware and software.

Figure 2:
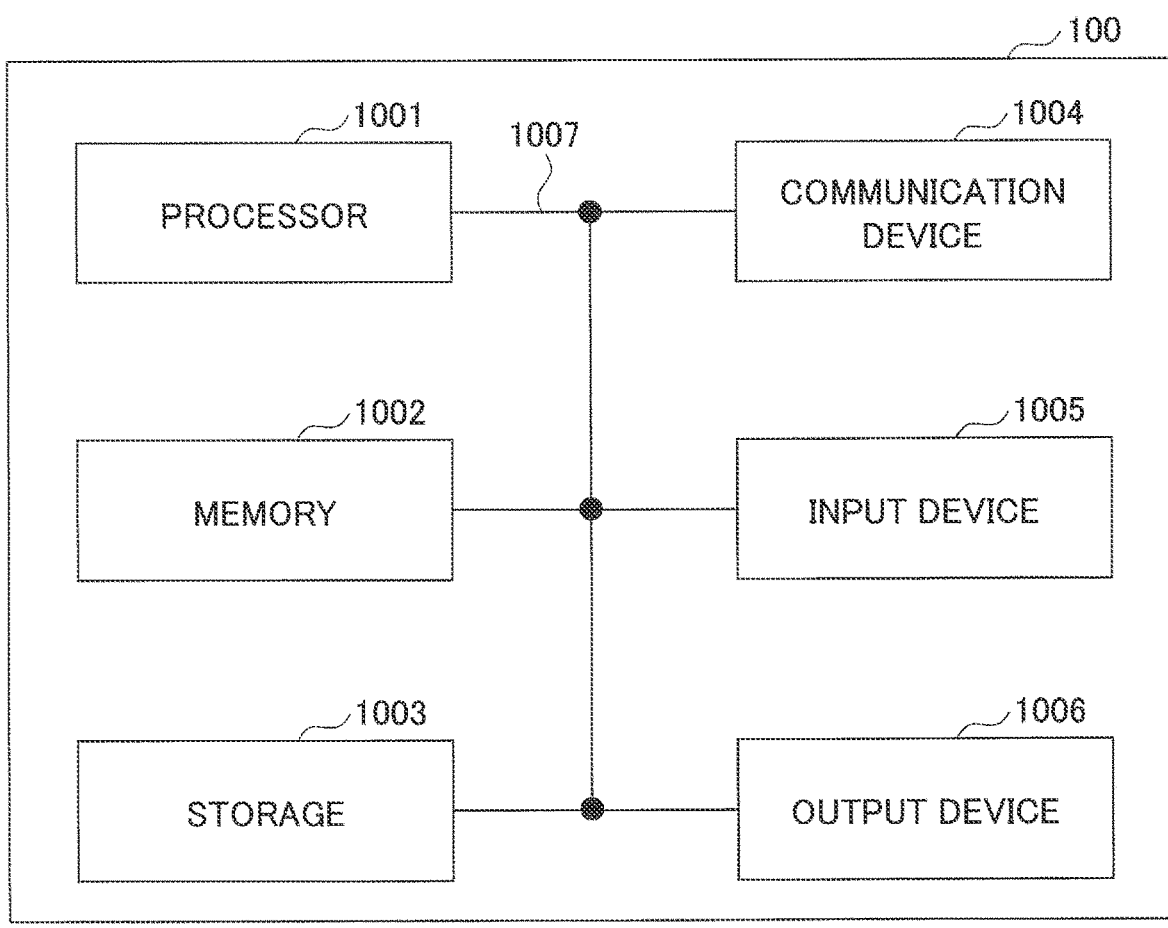
FIG. 2 is a diagram illustrating an example of the hardware configuration of the important life habit returning apparatus 100.

The important life habit returning apparatus 100 may be realized by a computer that performs processing according to the present embodiment. FIG. 2 is a diagram illustrating an example of a hardware configuration of a computer used as the important life habit returning apparatus 100. As shown in FIG. 2, the computer includes a processor 1001, a memory 1002, a storage 1003, a communication device 1004, an input device 1005, an output device 1006, and a bus 1007.

Each function of the important life habit returning apparatus 100 is realized by allowing a predetermined software (program) to be loaded onto a hardware such as the processor 1001 and the memory 1002, in which the processor 1001 performs an operation and controls communication by the communication device 1004, reading and writing of data in the memory 1002 and the storage 1003.

The processor 1001 operates, for example, an operating system to control the entire computer. The processor 1001 may be comprised of a central processing unit (CPU) including an interface with peripheral devices, a controller, an arithmetic unit, a register, and the like.

The processor 1001 reads a program (program code), a software module, or data from the storage 1003 or the communication device 1004 to the memory 1002 and performs various processes in accordance with the above. As the program, a program that causes a computer to execute at least a part of the operation described in the present embodiment is used. The program may be transmitted from the network via a telecommunication line.

The memory 1002 is a computer-readable recording medium and may comprise, for example, at least one of ROM (Read Only Memory), EPROM (Erasable Programmable ROM), EEPROM (Electrically Erasable Programmable ROM), RAM (Random Access Memory), or the like. The memory 1002 may be referred to as a register, cache, main memory (main memory), or the like. The memory 1002 can store programs (program codes), software modules, etc., that are executable to perform processing according to embodiments of the present invention.

The storage 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a key drive), a floppy disk, a magnetic strip, or the like. The storage 1003 may be referred to as an auxiliary storage device. The recording medium described above may be, for example, a database, server or other suitable medium containing memory 1002 or storage 1003.

The communication device 1004 is hardware (transmitting/receiving device) for performing communication between computers via a wired or wireless network, and is also referred to as a network device, a network controller, a network card, a communication module, or the like.

The input device 1005 is an input device (e.g., a keyboard, mouse, microphone, switch, button, sensor, etc.) that accepts external input. The output device 1006 is an output device (e.g., a display, speaker, LED lamp, etc.) that implements an external output. The input device 1005 and the output device 1006 may have an integral configuration (for example, a touch panel).

Each device, such as the processor 1001 and the memory 1002, is connected by a bus 1007 for communicating information. The bus 1007 may comprise a single bus or may comprise different buses between devices.

The important life habit returning apparatus 100 may also comprise hardware, such as a microprocessor, a digital signal processor (DSP), an ASIC (Application Specific Integrated Circuit), a PLD (Programmable Logic Device), and an FPGA (Field Programmable Gate Array), and all or part of each functional block may be realized by the hardware. For example, the processor 1001 may be implemented by at least one of these pieces of hardware.

(Operation of the Important Life Habit Returning Apparatus 100)

Figure 3:
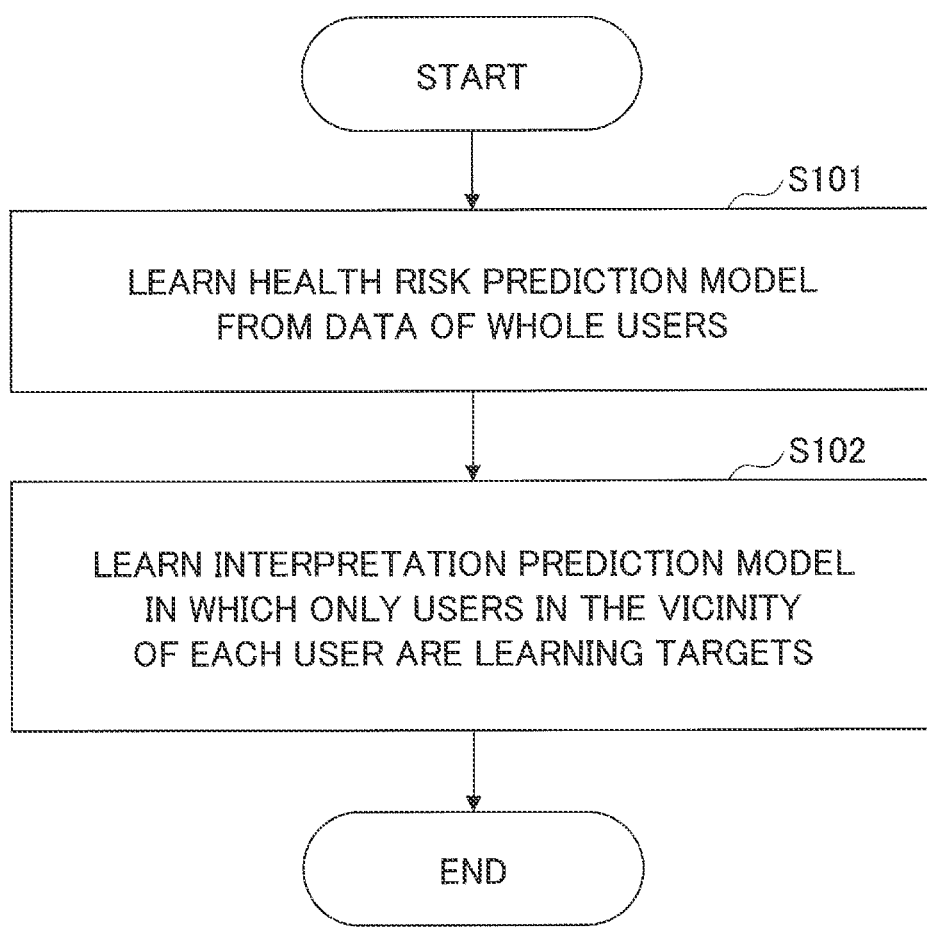
FIG. 3 is a flowchart illustrating an operation of the important life habit returning apparatus 100.

Next, the operation of the important life habit returning apparatus 100 having the functional configuration shown in FIG. 1 will be described in detail with reference to the flowcharts of FIG. 3 and FIG. 4. In the following operation, the medical examination data of the entire users and the interview data of life habits obtained by the data acquisition unit 20 are already stored in the data storage unit 22.

First, an explanation will be made with reference to FIG. 3. In FIG. 3, the process of S101 is performed in advance before access from the target user, and the process of S102 is performed when the target user actually accesses the important life habit returning apparatus 100. FIG. 4 shows the detailed contents of S102.

First, in S101, the model learning unit 21 reads out the health examination data of the entire users and the interview data of life habits from the data storage section 22 and learns the prediction model using machine learning software such as XGBoost as an example. This prediction model can be used, for example, to predict outcome values after 1, 2, and 3 years for health risk values such as systolic blood pressure as an example based on life habit data.

Subsequently, when access is received from the user terminal of a user (a target user) through the user interface unit 300, in S102, the interpretation model processing unit 400 learns the interpretation model in which only users in the vicinity of the target user are targets of learning, and the important life habit returning unit 42 presents important life habits to the target user based on the interpretation model. "Important life habits" are examples of interpretations of prediction.

(Details of S102)

Hereinafter, details of the learning process of the interpretation model and the presentation process of important life habits in S102 will be described with reference to flowcharts of FIG. 4 and FIGS. 5 to 7.

<S201: Extract Neighbor Users>

First, in S201 of FIG. 4, after the user interface unit 300 receives a request from the target user, the vicinity user search unit 40 searches users whose health state and life habits are close to those of the target user from all the users stored in the data storage unit 22 and passes the information of the vicinity users to be used when constructing the regression model to the linear regression model learning unit 41.

The target user is not required to be included in the users used for learning in S101. For example, the target user may enter his/her own health conditions and life habits through the user interface unit 300, and search for vicinity users can be searched using these health conditions and life habits.

A search method performed by the vicinity user search unit 40 will be described in more detail.

When the state vector of the target user (e.g., a vector representing health risk values such as BMI, systolic blood pressure, and life habit values such as exercise time and presence or absence of breakfast) is set to x and the state vector of the vicinity user is set to x', the distance to the vicinity user is represented by the Euclidean distance D(x, x'). A predetermined number of users whose D(x, x') is smaller than other users is designated as vicinity users of the target user. Since the vicinity user is not the ultimate vicinity user, it may be referred to as a vicinity user candidate.

Subsequently, the vicinity user search unit narrows down vicinity users based on validity of the approximation result. This has an effect of preventing false predictions such as increase of health risk value despite of life habit improvements.

Specifically, when the prediction model learned in the model learning unit 21 is set to f, a differential coefficient of the prediction model $$\frac{\partial f}{\partial x} \qquad \text{[Formula 1]}$$

and a slope of the health risk value between the target user and the vicinity user $$\frac{f(x') - f(x)}{|x' - x|} \qquad \text{[Formula 2]}$$

is calculated.

The differential coefficient given in Formula 1 represents a change amount in f when the state of the target user is changed slightly. For simplicity, suppose that the target user's state x is one dimension, when x and f(x) are represented in a two-dimensional graph, the differential coefficient given by Formula 1 represents the slope of the tangent at the point (x, f(x)) in the graph of f. The differential coefficient may be referred to as a predictive direction.

Formula 2 represents a slope of a line connecting the point corresponding to a state x' and a prediction result f(x') according to the prediction model f for a vicinity user candidate, and a point corresponding to a state x and a prediction result f(x) according to the prediction model f for the target user.

The vicinity user search unit 40 calculates a product of the slope of the health risk value between the target user and the vicinity user and the differential coefficient, and excludes the user from the vicinity user if the result is negative. In other words, $$\frac{\partial f}{\partial x} \cdot \frac{f(x') - f(x)}{|x' - x|} \qquad \text{[Formula 3]}$$

users (x') whose value of the formula 3 becomes negative are excluded from vicinity users. This means that a vicinity user having a prediction value largely deviated from a change trend (prediction direction) of the prediction value when the state of the target user changes is excluded from the final vicinity users. This meaning will be explained in more detail with reference to FIG. 5.

In FIG. 5, the curve indicated by "A" represents the prediction model f, and the dotted line indicated by "B" represents the slope of the health risk value between the target user and the vicinity user. Since the slope of the prediction model f at the point of current status is upper right, the prediction model f predicts that the BMI will increase as the amount of alcohol drinking increases.

On the other hand, if there is a vicinity user who has a low amount of drinking but a very high BMI prediction (f(x')), it may be a false prediction when a regression model for the approximation is generated. Therefore, as indicated by the dotted line of B, the slope between the target user and the vicinity user is calculated, and when the product of the differential coefficient in the prediction model f and the slope is negative, the vicinity user is excluded from the final vicinity users by regarding it as an outlier.

The g (line represented by C) shown in FIG. 5 is an interpretation model derived from a calculation based on the data of the final vicinity users. This is described in S202 below.

<S202: Learning the Linear Regression Model g>

In FIG. 4, in S202, in the vicinity user group X'{x'∈X'} extracted in S201, the linear regression model learning unit 41 learns a linear regression model g as an interpretation model that fits the learned prediction model f stored in the model storage unit 23. In more detail, $$L(f,g,\pi_x)=\Sigma_{x'\in X'}\pi_x(x')(f(x')-g(x'))^2 \quad \text{[Formula 4]}$$

g is learned so as to minimize the loss function L defined above. That is, for a group of vicinity users, the linear regression model g for interpretation is learned to approach the prediction model f. In the formula, $\pi_x(x')$ is a weight coefficient of the loss function, and defined by the Formula 5.

$$\pi_x(x') = \exp\left(\frac{-D(x, x')^2}{\sigma^2}\right) \quad \text{[Formula 5]}$$

Since the closer the user is, the more important the loss function is, the mechanism is to learn the interpretation model that fits the user closer to the target user. After learning the interpretation model, the linear regression model learning unit 41 passes the partial regression coefficient of the interpretation model to the important life habit returning unit 42. A certain partial regression coefficient indicates an amount of increase (or decrease) of the predicted result when values of items other than those corresponding to the partial regression coefficient are fixed and the value of ites corresponding to the partial regression coefficient is increased.

<S203: Return Important Life Habits>

In S203, the important life habit returning unit 42 returns (presents) the important life habits to the target user based on the partial regression coefficient passed from the linear regression model learning unit 41. Specifically, it is as follows.

As an example of life habits, an exercise time is set as ii. In this case, the partial regression coefficient as shown in Formula 6 that indicates the extent to which the health risk value g varies when ii is changed $$\frac{\partial g}{\partial i_1} \quad \text{[Formula 6]}$$

becomes importance of exercise time to health risk. In other words, life habits with a high value of the partial regression coefficient have a large effect on health risk.

The important life habit returning unit 42 receives a list, of Formula 7, of partial regression coefficients returned by the linear regression model learning unit 41, $$\left(\frac{\partial g}{\partial i_1}, \frac{\partial g}{\partial i_2}, \cdots, \frac{\partial g}{\partial K}\right) \quad \text{[Formula 7]}$$

and presents information to the user terminal based on the received list of the partial regression coefficient.

For example, the important life habit returning unit 42 rearranges the partial regression coefficients and the corresponding life habits in descending order of the partial regression coefficients and returns the same to the user terminal via the user interface unit 300. Life habits presented here are life habits that the target user should improve. The one above is more important.

Figure 7:
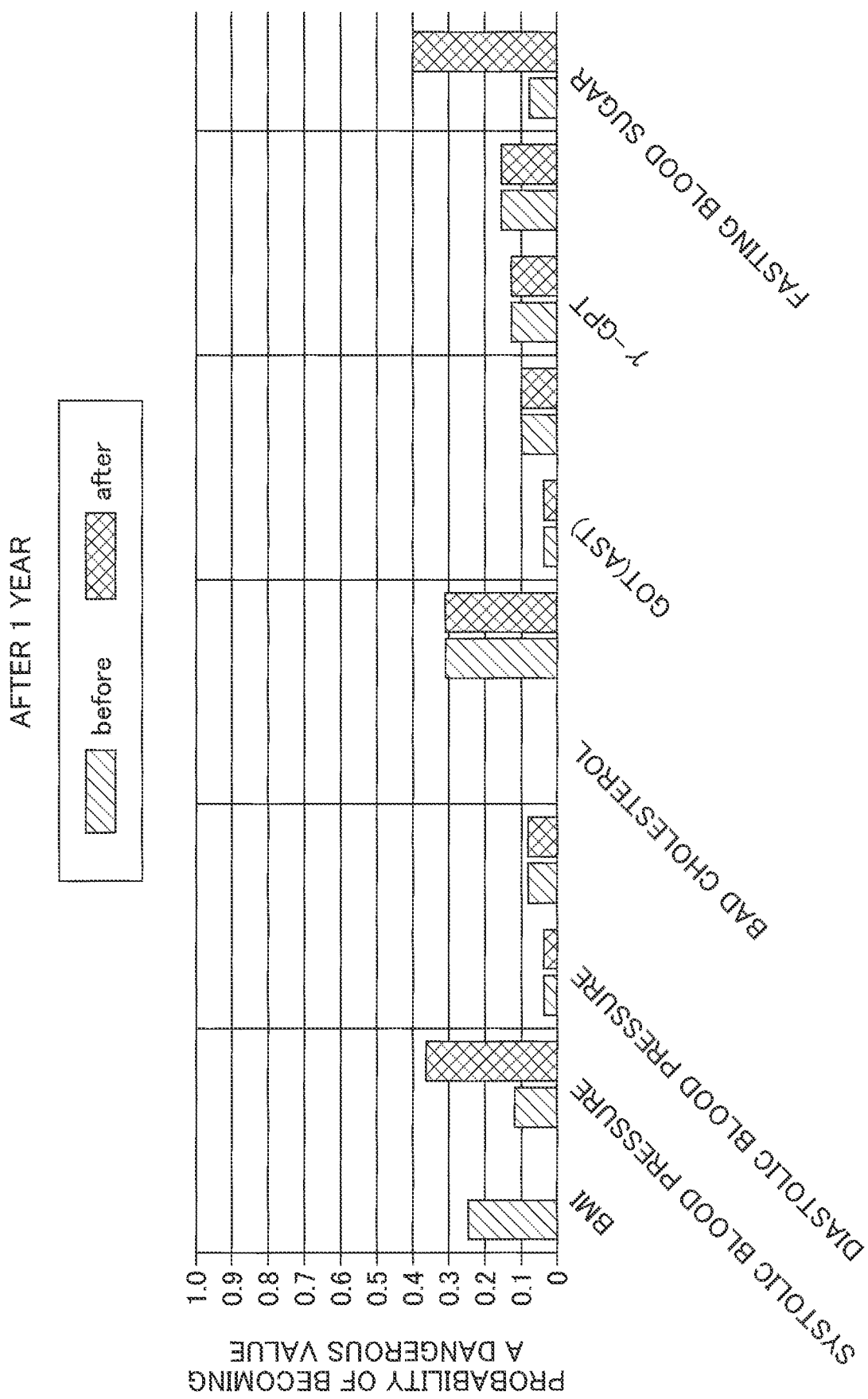
FIG. 7 is a diagram illustrating an example of a screen output by the important life habit returning apparatus 100.

FIG. 6 and FIG. 7 show an example of a screen displayed from the important life habit returning unit 42 to the user terminal.

FIG. 6 is an example of a screen showing life habits rearranged in descending order of the partial regression coefficients. In the example shown in FIG. 6, exercise habit ("have exercise habit of at least 30 minutes per day") is the life habit that has the greatest impact on health risk. In this example, current life habits are also displayed, indicating that the target user's answer is "yes" for "exercise habit of 30 minutes or more per day".

In addition, the target user can change current life habit so as to perform simulation to confirm how the predicted value of health risk changes by changing the current life habit on the screen shown in FIG. 6.

FIG. 7 shows a screen example of a simulation result of life habit change on a user terminal. In FIG. 7, each health risk value shown as "before" is predicted from current life habits.

For example, the target user changes a life habit $i_k$. The change mount is $\Delta i_k$. The information of the change is notified from the user terminal to the important life habit returning unit 42, and the important life habit returning unit 42 calculates the health risk value after the change by using the partial regression coefficient and $\Delta i_k$ corresponding to the life habit $i_k$ as follows, $$\left(g + \frac{\partial g}{\partial k} \cdot \Delta i_k\right) \quad \text{[Formula 8]}$$

and displays it on the screen of the user terminal via the user interface unit 300. In the example of FIG. 7, each health risk value after a change in life habit is shown as "after". By repeatedly changing life habits, the target user can visually understand the relationship between life habit improvements and changes in health risk values.

(Action and Effect of the Important Life Habit Returning Apparatus 100)

The important life habit returning apparatus 100 can present to each individual user important life habits with high accuracy that are closely related to health risks.

In addition, since the important life habit returning apparatus 100 according to the present embodiment independently performs interpretation of results and prediction, a prediction model tailored to the prediction target can be selected by the developer.

When extracting the vicinity user, if simply extracting users having close attributes, interpretation results of low validity may be generated. On the other hand, since the important life habit returning apparatus 100 according to the present embodiment narrows down the vicinity users using the prediction model, a highly valid interpretation result (highly accurate interpretation result) can be obtained.

(Examples of Other Fields of Application)

As described above, based on a life habit of the user, which is a controllable variable, the important life habit returning apparatus 100 according to the present embodiment predicts the health risk value of the user, which is another variable, and presents the effect of the improvement of the life habit by interpreting the prediction result.

Thus, in the field of predicting other variables based on controllable variables, the present invention allows prediction and interpretation of highly valid prediction results in areas other than health.

For example, in a service for recommending video targeting a user, it is possible to tune what kind of video recommendation is required for an individual user. In this case, it is possible to tune a recommendation method suitable for each individual by using the video's viewing history as a controllable variable, predicting the video to be recommended as another variable, and interpreting the prediction results using the method of the present invention.

SUMMARY OF EMBODIMENTS

As described above, according to the present embodiment, there is provided a prediction interpretation apparatus, including:

a data storage unit configured to store data of a plurality of users;

a model storage unit configured to store a prediction model learned from data of the whole of the plurality of users;

a vicinity user search unit configured to extract vicinity users for the target user from the data storage unit;

a linear regression model learning unit configured to learn a linear regression model approximated to the prediction model for the vicinity users; and an interpretation result output unit configured to output an interpretation result of prediction for the target user based on a partial regression coefficient of the linear regression model, wherein the vicinity user search unit extracts the vicinity user by narrowing vicinity user candidates extracted based on distance between users based on a prediction direction of the target user by the prediction model.

According to the above configuration, it becomes possible to perform prediction by machine learning and interpretation of the prediction with high precision. The important life habit returning apparatus 100 is an example of the prediction interpretation apparatus. The important life habit returning unit 42 is an example of the interpretation output unit.

The vicinity search unit calculates a differential coefficient of the prediction model as the prediction direction, calculates a slope of a line connecting a point corresponding to a state for the vicinity user candidate and a prediction result according to the prediction model, and a point corresponding to a state for the target user and a prediction result according to the prediction model, and extracts a vicinity user candidate whose product of the differential coefficient and the slope of the line is not negative as a vicinity user. According to this configuration, the vicinity user can be properly extracted.

The interpretation result output unit can output items corresponding to each of the partial regression coefficients in a row based on the order of the magnitude of partial regression coefficients of the linear regression coefficient. When the value of a certain item is changed, the interpretation result output unit outputs the prediction result after the change based on the partial regression coefficient. With this configuration, for example, the user can perform a change simulation of an item.

SUPPLEMENT TO EMBODIMENTS

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the important life habit returning apparatus 100 has been described using a functional block diagram, but such a device may be implemented in hardware, software, or a combination thereof. Software operated by a processor of the user apparatus 10 in accordance with embodiments of the present invention and software operated by a processor of the base station 20 in accordance with embodiments of the present invention may be stored in random access memory (RAM), flash memory, read-only memory (ROM), EPROM, EEPROM, register, hard disk (HDD), removable disk, CD-ROM, database, server, or any other suitable storage medium.

As used herein, the term "based" does not mean "solely based" unless otherwise specified. In other words, the expression "based on" means both "solely" and "at least based on".

As long as "include", "include", and variations thereof are used herein or in the claims, these terms are intended to be comprehensive as is the term "comprising". Moreover, the term "or" as used herein or in the claims is not intended to be an exclusive-OR.

In the entirety of the present disclosure, where an article has been added by translation, for example a, an and the English language, these articles may include more than one unless the context clearly indicates that they are not.

While the invention has been described in detail above, those skilled in the art will appreciate that the invention is not limited to the embodiments described herein. The invention may be practiced as modifications and variations without departing from the spirit and scope of the invention as defined by the appended claims. Accordingly, the description herein is for purposes of illustration and is not intended to have any limiting meaning with respect to the present invention.

This patent application claims priority to Japanese Patent Application No. 2018-157718, filed Aug. 24, 2018, and the entire contents of Japanese Patent Application No. 2018-157718 are hereby incorporated by reference.

DESCRIPTION OF SYMBOLS

100 Important life habit returning apparatus
200 Predictive model processing unit
20 Data acquisition unit
21 Model prediction unit
22 Data storage unit
23 Model storage
300 User interface unit
400 Interpretation model processing unit
40 Vicinity user search unit
41 Linear regression model learning unit
42 Important life habit returning unit
1001 Processor
1002 Memory
1003 Storage
1004 Communication device
1005 Input device
1006 Output device

The invention claimed is:

1. A prediction interpretation apparatus, comprising:
a memory configured to store data of a plurality of users, wherein the memory is configured to store a prediction model learned from data of the plurality of users; and
a processor configured to extract final vicinity users for a target user from the memory,
wherein the processor is configured to learn a linear regression model approximated to the prediction model for the final vicinity users;
wherein the processor is configured to output interpretation results of prediction for the target user based on one or more partial regression coefficients of the linear regression model;
wherein the interpretation results comprise one or more life habits presented to the target user in descending order based upon an impact between a life habit of the one or more life habits and one or more health risks of the target user;
wherein the processor extracts the final vicinity users by narrowing vicinity user candidates extracted based on a distance between users based on a prediction direction of the target user by the prediction model, and
wherein the processor is configured to narrow the vicinity user candidates by excluding at least one vicinity user candidate from the final vicinity users based upon a deviation between a prediction value associated with the at least one vicinity user candidate and the prediction direction of the target user.

2. The prediction interpretation apparatus as claimed in claim 1, wherein the processor:
calculates a differential coefficient of the prediction model as the prediction direction,
calculates a slope of a line connecting a point corresponding to a state for one of the vicinity user candidates and a prediction result according to the prediction model, and a point corresponding to a state for the target user and a prediction result according to the prediction model, and
extracts a vicinity user candidate whose product of the differential coefficient and the slope of the line is not negative as a vicinity user.

3. The prediction interpretation apparatus as claimed in claim 2,
wherein the processor outputs one or more items corresponding to each of the one or more partial regression coefficients based on an order of magnitude of the one or more partial regression coefficients of the linear regression model.

4. The prediction interpretation apparatus as claimed in claim 1,
wherein the processor outputs one or more items corresponding to each of the one or more partial regression coefficients based on an order of magnitude of the one or more partial regression coefficients of the linear regression model.

5. The prediction interpretation apparatus as claimed in claim 4,
wherein, when a value of a certain item is changed, the processor outputs a changed prediction result based on the one or more partial regression coefficients.

6. A prediction interpretation method executed by a prediction interpretation apparatus including a memory configured to store data of a plurality of users; wherein the memory is configured to store a prediction model learned from data of the plurality of users, the prediction interpretation method comprising:
extracting final vicinity users for a target user from the memory;
learning a linear regression model approximated to the prediction model for the final vicinity users; and
outputting interpretation results of prediction for the target user based on one or more partial regression coefficients of the linear regression model,
wherein the interpretation results comprise one or more life habits presented to the target user in descending order based upon an impact between a life habit of the one or more life habits and one or more health risks of the target user, and
wherein the prediction interpretation apparatus extracts the final vicinity users by narrowing vicinity user candidates extracted based on a distance between users based on a prediction direction of the target user by the prediction model, and
wherein narrowing the vicinity user candidates comprises excluding at least one vicinity user candidate from the final vicinity users based upon a deviation between a prediction value associated with the at least one vicinity user candidate and the prediction direction of the target user.

* * * * *